(12) United States Patent
Watanabe et al.

(10) Patent No.: US 12,154,326 B2
(45) Date of Patent: Nov. 26, 2024

(54) INFORMATION PROCESSING DEVICE AND INFORMATION PROCESSING METHOD

(71) Applicant: NTT DOCOMO, INC., Tokyo (JP)

(72) Inventors: Syuusuke Watanabe, Tokyo (JP); Tadashige Nagae, Tokyo (JP); Mitsuteru Fukuyama, Tokyo (JP); Masakazu Hamano, Tokyo (JP); Takefumi Yamada, Tokyo (JP); Takashi Hara, Tokyo (JP); Yuichiro Segawa, Tokyo (JP); Yasuhiro Kitamura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 616 days.

(21) Appl. No.: 17/438,102

(22) PCT Filed: Mar. 12, 2020

(86) PCT No.: PCT/JP2020/010790
§ 371 (c)(1),
(2) Date: Sep. 10, 2021

(87) PCT Pub. No.: WO2020/189492
PCT Pub. Date: Sep. 24, 2020

(65) Prior Publication Data
US 2022/0254154 A1     Aug. 11, 2022

(30) Foreign Application Priority Data

Mar. 18, 2019   (JP) .................................. 2019-049807

(51) Int. Cl.
*G06V 20/17*     (2022.01)
*B64C 13/18*     (2006.01)
(Continued)

(52) U.S. Cl.
CPC .............. *G06V 20/17* (2022.01); *B64C 13/18* (2013.01); *G05D 1/106* (2019.05); *B64U 30/21* (2023.01); *B64U 2101/30* (2023.01)

(58) Field of Classification Search
CPC ........ G06V 20/17; B64C 13/18; G05D 1/106; G05D 1/101; B64U 30/21; G01C 21/20; G01M 99/00; G08G 5/00
See application file for complete search history.

(56) References Cited

U.S. PATENT DOCUMENTS

| | | | | |
|---|---|---|---|---|
| 2018/0089818 | A1* | 3/2018 | Kobayashi | G06T 7/001 |
| 2018/0286627 | A1* | 10/2018 | Ueno | H01J 37/20 |
| 2019/0212741 | A1* | 7/2019 | Lee | G08B 21/182 |

FOREIGN PATENT DOCUMENTS

JP     2018021491 A     2/2018

OTHER PUBLICATIONS

Noronha et, S. Detection and Modeling of Buildings from Multiple Aerial Images, Google Scholar, IEEE Transactions on Pattern Analysis and Machine Intelligence, vol. 23, No. 5, May 2001, pp. 501-518. (Year: 2001).*

(Continued)

*Primary Examiner* — Russell Frejd
(74) *Attorney, Agent, or Firm* — DILWORTH IP, LLC

(57) ABSTRACT

Outward leg instructing unit provides a first instruction for causing drone to acquire examination data of a facility while flying in the vicinity of the facility. Position information acquiring unit acquires position information of a place of focus specified based on the examination data acquired in accordance with the first instruction. Return leg instructing unit provides, as a second instruction, an instruction for causing drone to acquire a greater amount of examination data than that acquired in accordance with the first instruction with regard to the place of focus indicated by the acquired position information, while flying so as to return on (Continued)

a path flown due to the first instruction. Return leg instructing unit provides as the second instruction an instruction to acquire examination data including image data of a greater number of shots, as compared with shooting performed in accordance with the first instruction.

10 Claims, 14 Drawing Sheets

(51) Int. Cl.
    *B64U 30/21*     (2023.01)
    *B64U 101/30*     (2023.01)
    *G05D 1/00*     (2024.01)

(56) References Cited

OTHER PUBLICATIONS

Quigley et al, M. Target, Acquisition, Localization, and Surveillance Using a Fixed-Wing Mini-UAV and Gimbaled Camera, Google Scholar, Proceedings of the 2005 IEEE International Conference on Robotics and Automation, Apr. 2005, pp. 2600-2605. (Year: 2005).*
Mathe et al, K. Vision and Control for UAVs: A Survey of General Methods and of Inexpensive Platforms for Infrastructure Inspection, Google Scholar, Sensors, Jun. 2015, pp. 14887-14916. (Year: 2015).*
Freimuth et al. H. Planning and Executing Construction Inspections with Unmanned Aerial Vehicles, Google Scholar, Elsevier, Automation in Construction, vol. 96, Dec. 2018, pp. 540-553. (Year: 2018).*
International Search Report issued in corresponding PCT Application No. PCT/JP2020/010790, dated Jun. 2, 2020.

* cited by examiner

| WINDSPEED | DISTANCE COEFFICIENT |
|---|---|
| <TH1 | 1.0 |
| ≥TH1, <TH2 | 0.8 |
| ≥TH2 | 0.6 |

FIG. 10

| DETERIORATION PERIOD | DETERIORATION LEVEL |
|---|---|
| <TH11 | LOW |
| ≥TH11, <TH12 | MODERATE |
| ≥TH12 | HIGH |

FIG. 12

| DETERIORATION LEVEL | SHOOTING INTERVAL (D1>D11>D12>D13) |
|---|---|
| LOW | D11 |
| MODERATE | D12 |
| HIGH | D13 |

FIG. 13

| TYPE OF DETERIORATION | SHOOTING INTERVAL (D1>D21>D22>D23) |
|---|---|
| DETACHMENT, DETERIORATION-RELATED DISCOLORATION | D21 |
| CORROSION, BREAKAGE | D22 |
| SEPARATION, CRACKING, DEFORMATION | D23 |

FIG. 15

| TYPE OF STRUCTURE | SHOOTING INTERVAL (D1>D31>D32>D33) |
|---|---|
| STEEL TOWER, FOUNDATION | D31 |
| LADDER | D32 |
| ANTENNA, ELECTRICAL EQUIPMENT | D33 |

FIG. 17

INFORMATION PROCESSING DEVICE AND INFORMATION PROCESSING METHOD

TECHNICAL FIELD

The present invention relates to a technology for supporting facility examination.

BACKGROUND

As a technology for supporting facility examination, Japanese Patent Application No. 2018-21491A discloses a technology for acquiring rotation information indicating an orientation of a nacelle and a phase of blades of a wind turbine targeted for inspection, and generating data of a flight route (inspection route) of an unmanned aircraft that acquires data for use in inspection, based on the rotation information.

SUMMARY OF INVENTION

For facilities such as base stations, examination data (image data, etc.) is acquired by use of an aerial vehicle such as a drones in the technology of Japanese Patent Application No. 2018-21491A. Examination is carried out to find places that require repair as well as places that are highly likely to require repair. Examination is carried out by inspecting facilities based on acquired examination data. To prevent oversight during examination, it is desirable to acquire as detailed examination data as possible. However, increasing an amount of detailed examination data results in an inspection load. Accordingly, an object of the present invention is to suppress an inspection load when performing inspection of facilities based on examination data by use of an aerial vehicle, while preventing oversight during examination performed based on the examination data.

To achieve the stated object, the present invention provides an information processing device having a first instruction unit configured to provide a first instruction for causing an aerial vehicle having a function for acquiring examination data of an examination target at a position distant therefrom to acquire the examination data of the facility while flying within the vicinity of the facility, a position acquiring unit configured to acquire position information of a specific place indicated as requiring detailed inspection based on the examination data acquired in accordance with the first instruction, and a second instructing unit configured to provide a second instruction for causing the aerial vehicle to acquire a greater amount of examination data than that acquired in accordance with the first instruction relative to the specific place indicated by the acquired position information, the aerial vehicle following a flight path so as to return along on a flight path flown due to the first instruction.

According to the present invention, an inspection data load based on examination of data of facilities acquired using an aerial vehicle can be limited, while still preventing examination oversight performed using the examination data.

BRIEF DESCRIPTION OF THE DRAWINGS

FIG. 10 is a diagram showing an example of a coefficient table according to the present invention.

FIG. 12 is a diagram showing an example of a deterioration level table according to the present invention.

FIG. 13 is a diagram showing an example of an image shooting interval table according to the present invention.

FIG. 15 is a diagram showing an example of an image shooting interval table in a modification according to the present invention.

FIG. 17 is a diagram showing an example of an image shooting interval table in a modification according to the present invention.

DETAILED DESCRIPTION

1. Embodiments

Figure 1:
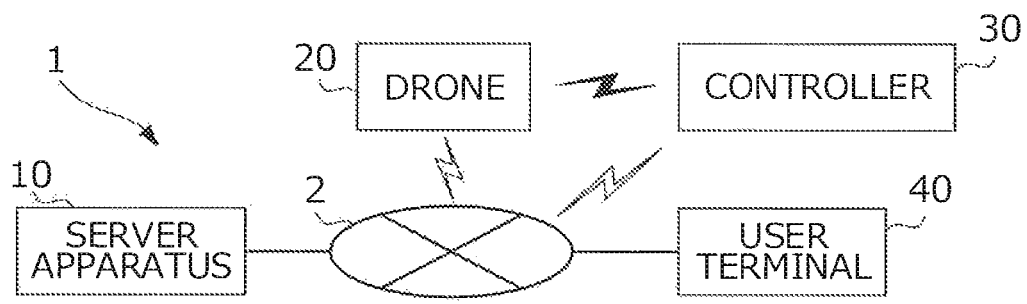
FIG. 1 is a diagram showing an example of the overall configuration of a facility examination system according to an embodiment of the present invention.

FIG. 1 shows an example of the overall configuration of facility examination system 1 according to an embodiment. Facility examination system 1 is a system for supporting facility examination that is based on examination data acquired by an aerial vehicle that is provided with an examination function for acquiring examination data of an examination target from a position at a distance therefrom. Examination data is data that is used for determining whether the target has deteriorated (corrosion, separation, detachment, breakage, cracking, deformation, deterioration-related discoloration, etc.), and determining whether the target requires repairs.

Optical video (photographic) data, measurement data of infrared sensors and measurement data of ultrasonic sensors, for example, are used as examination data. In the present embodiment, photographic data is used as examination data. The examination targets are facilities that require periodic examination to check for occurrence of deterioration at or above a certain level, and include among other bridges, building and tunnels, for example. The present embodiment describes a case in which the examination targets are mobile communication base stations, (in particular, antenna facilities).

Determination of whether deterioration has occurred and whether repair is required based on examination data is primarily made by an inspector. The inspector may determine whether deterioration or the like exists by viewing displayed examination data, and may also determine whether deterioration and the like exists after performing processing on a computer (image processing, etc.) for further analyzing examination data. It is of note that the agent of determination is not limited to a person, and determination of whether deterioration and the like exists may be made using AI (Artificial Intelligence), for example.

Facility examination system 1 is provided with network 2, server apparatus 10, drone 20, and controller 30. Network 2 is a communication system including a mobile communication network, the Internet and the like, and relays exchange of data between apparatuses that access the system. Network 2 is accessed by server apparatus 10 via wired communication (wireless communication may also be used), and by drone 20 and controller 30 via wireless communication.

Drone 20 is provided with an image shooting function as the examination function mentioned above, and, in the present embodiment, is a rotary-wing aerial vehicle that flies under rotation of one or more rotary wings. Drone 20 does not only fly under manual operation by an operator but can fly autonomously on a pre-instructed flight path or in real time. Controller 30 is an apparatus that performs control in a proportional manner (proportional control) and is used by the operator when operating drone 20.

In the present embodiment, examples in which drone 20 flies autonomously will be primarily described, although it is assumed that, in a case that an unexpected situation arises, the operator is close by and in an emergency is able to perform manual operation by use of controller 30. Server apparatus 10 performs various types of processing (described in detail later) for flying drone 20 when shooting images of facilities and for instructing shooting. Server apparatus 10 is an example of an "information processing device" of the present invention.

Figure 2:
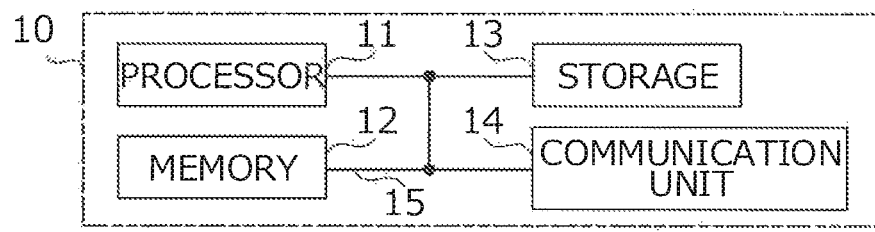
FIG. 2 is a diagram showing an example of the hardware configuration of a server apparatus according to the present invention.

FIG. 2 shows an example of the hardware configuration of server apparatus 10. Server apparatus 10 may be physically constituted as a computer apparatus that includes processor 11, memory 12, storage 13, communication unit 14, and bus 15. It is of note that in the following description the term "apparatus" can be read as circuit, device, unit, and the like.

Also, an apparatus is not limited to a single apparatus and a plurality of apparatuses may be provided, and also some of the plurality of apparatuses may not be provided. Processor 11 performs overall control of the computer by operating an operating system, for example. Processor 11 may be constituted of a CPU (Central Processing Unit) that includes an interface with peripheral apparatuses, a control apparatus, a computational apparatus, and a register.

For example, a baseband signal processing unit and the like may be realized by processor 11. Also, processor 11 reads out programs (program code), software modules, data and the like to memory 12 from storage 13 and/or communication unit 14, and performs various types of processing (in accordance therewith). As for the programs, programs that are caused by the computer to execute at least some of operations described in the above-mentioned embodiment are used.

The various types of processing mentioned above are described as being executed by one processor 11, but they may be executed simultaneously or sequentially by two or more processors 11. Processor 11 may be implemented by one or more chips. It is of note that programs may be transmitted from a network via a telecommunication line. Memory 12 is a computer-readable recording medium.

Memory 12 may, for example, be constituted of at least one of a ROM (Read Only Memory), an EPROM (Erasable Programmable ROM), an EEPROM (Electrically Erasable Programmable ROM), and a RAM (Random Access Memory). Memory 12 may be referred to as a register, a cache, a main memory (main storage apparatus), and the like. Memory 12 is able to save programs (program code), software modules and the like that can be executed to implement a wireless communication method according to an embodiment of the present disclosure.

Storage 13 is a computer-readable recording medium, and may, for example, be constituted of at least one of an optical disc such as a CD-ROM (Compact Disc ROM), a hard disk drive, a flexible disk, a magneto-optical disc (e.g., compact disc, digital versatile disc, Blu-ray (registered trademark) disc), a smart card, a flash memory (e.g., card, stick, key drive), a floppy (registered trademark) disk, and a magnetic strip.

Storage 13 may also be referred to as an auxiliary storage apparatus. The above-mentioned storage medium may, for example, also be a database, server or other appropriate medium including memory 12 and/or storage 13. Communication unit 14 is hardware (transceiver device) for performing communication between computers via a wired network and/or a wireless network. Communication unit 14 is also referred to as a network device, a network controller, a network card, a communication module and the like, for example.

For example, the above-mentioned transceiver antenna, amplifier unit, transceiver unit, transmission path interface and the like may also be realized by communication unit 14. The transceiver unit may also be implemented by being physically or logically separated into a transmitting unit and a receiving unit. Also, apparatuses such as processor 11 and memory 12 are connected by bus 15 for communicating information. Bus 15 may be constituted using a single bus, and may also be constituted using different buses between different apparatuses.

Figure 3:
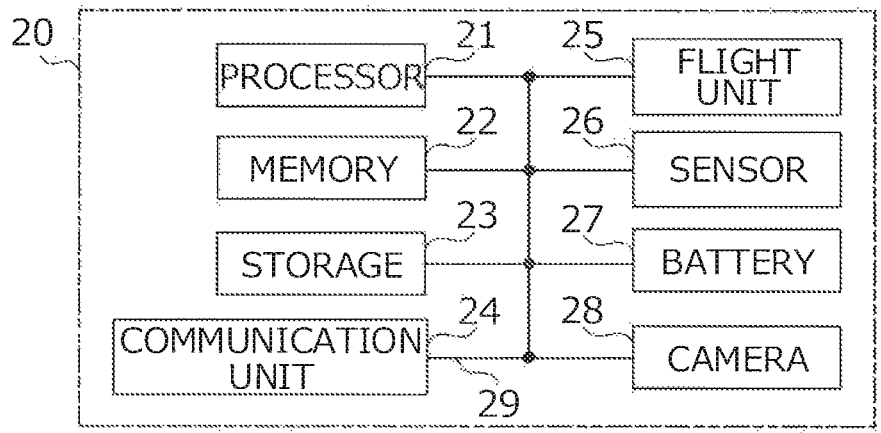
FIG. 3 is a diagram showing an example of the hardware configuration of a drone according to the present invention.

FIG. 3 shows an example of the hardware configuration of drone 20. Drone 20 may be physically constituted as a computer apparatus that includes processor 21, memory 22, storage 23, communication unit 24, flight unit 25, Sensor 26, battery 27, camera 28, and bus 29. Hardware such as processor 21 and the like of the same name as that in FIG. 2 is hardware of the same type as FIG. 2 but differs in performance, specification and the like.

Communication unit 24 has a function for performing communication with controller 30 (e.g., a function for wireless communication using 2.4 GHz radio waves), in addition to communication with network 2. Flight unit 25 is an apparatus provided with a motor, rotors and the like, used for flying drone 20. Flight unit 25 is able to perform operations such as moving drone 20 in any direction when airborne and causing drone 20 to remain stationary (hover).

Sensor 26 is an apparatus having a sensor group for acquiring information required for flight control. Sensor 26 is, for example, provided with a position sensor that measures a position (latitude and longitude) of drone 20, and a direction sensor that measures a direction in which drone 20 is facing (direction in which the front of drone 20 (, which in drones is fixed,) is facing). Also, sensor 26 is provided with an altitude sensor that measures an altitude of drone 20, and a speed sensor that measures a speed of drone 20.

Further, sensor 26 is provided with an IMU (Inertial Measurement Unit) that measures three-axial angular velocity and three-directional acceleration, and an obstacle sensor that detects obstacles by use of infrared rays, ultrasonic waves, millimeter waves, and the like. Battery 27 is an apparatus that stores electric power and supplies power to units of drone 20. Camera 28 is provided with an image sensor, optical components and the like, and shoots images of objects that are in the direction in which the lens is facing.

Figure 4:
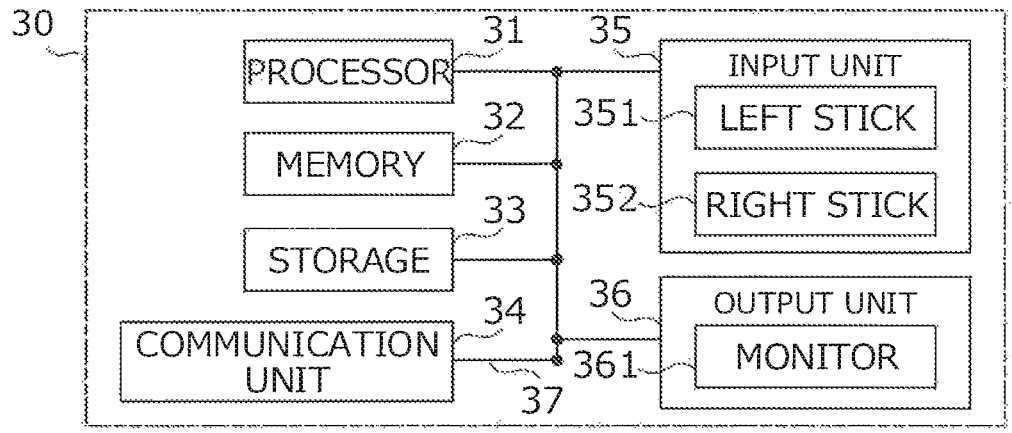
FIG. 4 is a diagram showing an example of the hardware configuration of a controller according to the present invention.

FIG. 4 shows an example of the hardware configuration of controller 30. Controller 30 may be physically constituted as a computer apparatus that includes processor 31, memory 32, storage 33, communication unit 34, input unit 35, output unit 36, and bus 37. Hardware such as processor 31 and the like of the same name as that in FIG. 2 is hardware of the same type as FIG. 2 but differing in performance, specification and the like.

Input unit 35 is an input device (e.g., switch, button, sensor, etc.) that receives input from the outside. In particular, input unit 35 is provided with left stick 351 and right stick 352, and receives manual operation of the sticks as movement operations in a front-back direction, up-down direction, left-right direction, and rotational direction of drone 20. Output unit 36 is an output device (e.g., monitor 361, speaker, LED (Light Emitting Diode) lamp, etc.) that implements output to the outside. It is of note that input unit 35 and output unit 36 may also be made integral (e.g., where monitor 361 is a touch screen).

The above apparatuses may be configured to include hardware such as a microprocessor, a DSP (Digital Signal Processor), an ASIC (Application Specific Integrated Circuit), a PLD (Programmable Logic Device), and an FPGA (Field Programmable Gate Array). Also, some or all of the functional blocks of the above apparatuses may be realized by the above hardware. For example, processor 11 may be implemented using at least one of the above hardware.

The functions of the apparatuses with which facility examination system 1 is provided are realized by respective processors performing computations and performing control of communication by respective communication units and control of reading and/or writing of data from/to a memory and storage, thereby causing predetermined software (programs) to be loaded into hardware such as the processors and memories.

Figure 5:
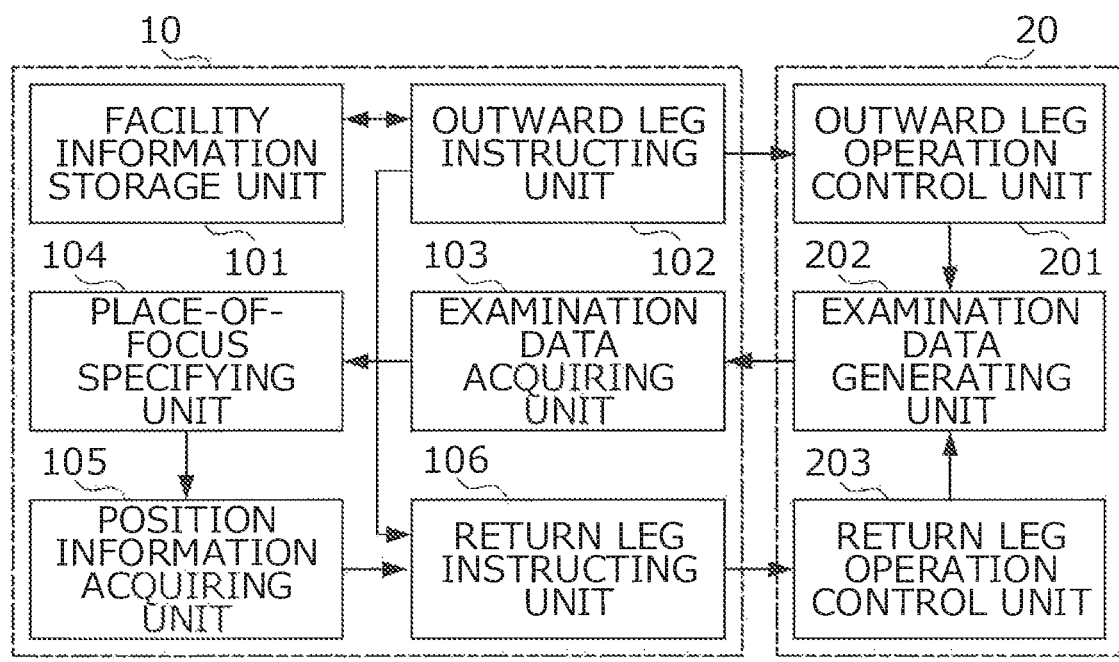
FIG. 5 is a diagram showing functional configurations realized by different apparatus according to the present invention.

FIG. 5 shows a functional configuration that is realized by apparatuses. Server apparatus 10 is provided with facility information storage unit 101, outward leg instructing unit 102, examination data acquiring unit 103, place-of-focus specifying unit 104, position information acquiring unit 105, and return leg instructing unit 106. Drone 20 is provided with outward leg operation control unit 201, examination data generating unit 202, and return leg operation control unit 203.

Facility information storage unit 101 has a function for storing information (facility information) relating to facilities targeted for examination, and, in the present embodiment, stores information relating to base stations as facility information. Facility information storage unit 101 stores, as facility information, information such as a position, a direction in which to shoot and a height from the ground of an antenna facility installed in the base stations, and a facility ID that identifies the facility, for example. The respective facility information is information required to determine a flight path and orientation for drone 20 to acquire examination data of facilities targeted for examination.

Outward leg instructing unit 102 provides a first instruction that causes drone 20 having the above examination function (function for acquiring examination data of a target from a position distanced therefrom) to acquire examination data of a facility while flying in the vicinity of the facility. Outward leg instructing unit 102 is an example of a "first instructing unit" of the present invention. In facility examination system 1, drone 20 acquires examination data while flying out and back on a flight path along the examination target. Outward leg instructing unit 102 provides, as the first instruction, an instruction of the outward leg of the flight path along the examination target.

It is assumed that, in facility examination system 1, the drone ID and communication destination (IP address, etc.) of drone 20 that is to be instructed are registered in advance and stored in association with each other in server apparatus 10. For example, when a user moves drone 20 to a location of a base station and starts examination, the facility ID of the facility targeted for examination and the drone ID of the drone that is to be flown are input to controller 30 (or a smartphone, etc.) and transmitted to server apparatus 10. Outward leg instructing unit 102 reads out facility information including the received facility ID from facility information storage unit 101.

Outward leg instructing unit 102 determines a flight path for image shooting the antenna facility of the base station, based on the position, height and direction in which to shoot images as indicated by the read facility information. Outward leg instructing unit 102 determines, as the flight path of the outward leg, a path that climbs from the ground to the height of the antenna facility at a position that is a predetermined distance from the position of the antenna facility in the direction in which to shoot images, for example. Outward leg instructing unit 102 may determine a flight path that climbs straight up, and, if a detailed shape (e.g., length and height of horizontally protruding parts, etc.) of the antenna facility is shown in the facility information unit 102 may also determine a flight path that climbs while changing position in line with the detailed shape that is shown.

Outward leg instructing unit 102 generates outward leg instruction data for instructing image shooting at shooting interval D1, which is the interval of a predetermined flight distance (to perform image shooting after moving shooting interval D1 after shooting was last performed), for example, while flying on the determined flight path, and transmits the generated outward leg instruction data to the communication destination that is stored in association with the received drone ID. Outward leg instructing unit 102 sets shooting interval D1 such that the portion of the facility that was positioned at the upper edge of the angle of view when shooting was last performed is positioned at the lower edge of the angle of view during current shooting. In other words, setting shooting interval D1 is set such that the facility image shooting ranges overlap thereby ensuring that there is no omission in shooting the facility (no portions are left unshot) on the outward leg.

The transmitted outward leg instruction data is received by outward leg operation control unit 201 of drone 20. Outward leg operation control unit 201 controls the operations of drone 20 (in particular, flight unit 25 and camera 28) on the outward leg, in accordance with the first instruction provided by outward leg instructing unit 102. Outward leg operation control unit 201 causes drone 20 to take off upon receipt of the outward leg instruction data, for example, and fly to the starting point of the flight path indicated by the received outward leg instruction data. Within this time period, outward leg operation control unit 201 controls drone 20 to fly around any obstacles that are detected by the obstacle sensor.

Upon reaching the starting point, outward leg operation control unit 201 starts flight control for flying on the flight path of the outward leg, and also starts image shooting control for performing image shooting at instructed shooting interval D1. Upon causing image shooting to be performed by way of image shooting control, outward leg operation control unit 201 sends to examination data generating unit 202 notification that image shooting has been performed. Upon receiving notification from outward leg operation control unit 201, examination data generating unit 202 generates examination data for the facility targeted for examination.

Examination data generating unit 202 generates, as examination data, data in which the facility ID of the facility targeted for examination, the drone ID of drone 20, the image shooting date/time, and the position, direction and altitude of drone 20 at the time of shooting are assigned to image data of images shot by camera 28 when, for example, notification is received. Examination data generating unit 202 transmits the generated examination data to server apparatus 10. The transmitted examination data is received by examination data acquiring unit 103 of server apparatus 10.

Examination data acquiring unit 103 acquires the received examination data as examination data generated by drone 20 that flies in the vicinity of the facility. Examination data acquiring unit 103 supplies the acquired examination data to place-of-focus specifying unit 104. Place-of-focus specifying unit 104 specifies places (hereinafter, "places of focus") that require focused examination as determined based on the supplied examination data. Places of focus are an example of a "specific place" in the present invention.

Otherwise stated, places of focus are places of a facility targeted for inspection that require more detailed inspection than those of other places of the targeted facility. In the present embodiment, place-of-focus specifying unit 104 analyzes images of the facility shown indicated by the examination data and specifies, as places of focus, places where deterioration exists (for example, where corrosion, separation, detachment, breakage, cracking, deformation, or the like exists (hereinafter, "deteriorated state") at a level that is at or above a certain level.

Place-of-focus specifying unit 104 stores deterioration feature information from images that have been shot and show deteriorated states, and specifies, as places of focus, places where the features indicated by the deterioration feature information are shown to exist at or above a predetermined level in shot images, for example. Also, in a case where a degree of change of the feature amount in images of a place of a facility is at or above a threshold value compared with images of the place of the same facility shot in the past, place-of-focus specifying unit 104 may specify the place based on past images as a place of focus.

It is of note that place-of-focus specifying unit 104 may specify places of focus using known technology (e.g., technology described in JP 2016-65809 or JP 2015-105905, etc.) for specifying from images deteriorated places, other than by use of the above-described methods. Upon specifying a place of focus, place-of-focus specifying unit 104 supplies the examination data used for specifying the place of focus to position information acquiring unit 105.

Position information acquiring unit 105 acquires position information indicating a position of places (the places of focus) that are shown as requiring detailed inspection based on the examination data acquired in accordance with the first instruction provided by outward leg instructing unit 102. Position information acquiring unit 105 is an example of a "position acquiring unit" of the present invention. In the present embodiment, position information acquiring unit 105 acquires the position, direction and height of drone 20 shown indicated by the supplied examination data to determine the position information of the places of focus requiring detailed inspection.

The position, direction and height shown by the examination data are the position (position at the time of shooting), direction (direction at the time of shooting), and height (height at the time of shooting) of drone 20 when the images in which the places of focus are specified were shot. In other words, the places of focus are located in the direction in which drone 20 is facing at the time of shooting and are determined from the position and height of drone 20 at the time of shooting. Position information acquiring unit 105 supplies the acquired position information (position, direction and height of drone 20 when places of focus were shot) to return leg instructing unit 106.

Also, the determined flight path and the transmission destination of outward leg instruction data are supplied to return leg instructing unit 106 from outward leg instructing unit 102. Return leg instructing unit 106 provides a second instruction that causes drone 20 having the above examination function to acquire examination data of the facility while flying in the vicinity of the facility. Return leg instructing unit 106 is an example of a "second instructing unit" of the present invention. Return leg instructing unit 106 provides, as the second instruction, an instruction for the return leg of the round trip flight path along the examination target mentioned above.

Specifically, return leg instructing unit 106 provides, as the second instruction, an instruction that causes drone 20 to acquire examination data such that the information amount is greater than that of the first instruction with regard to the places of focus indicated by the position information acquired by position information acquiring unit 105 while flying so as to return on the path flown in accordance with the first instruction. In the present embodiment, return leg instructing unit 106 provides, as the second instruction, an instruction to return on the flight path from the end point of the outward leg to the start point as the return leg.

It is of note that because it is not necessarily required to return to the start point of the outward leg on the return leg, return leg instructing unit 106 may provide, as the second instruction, an instruction to fly on a path that differs to the outward leg from partway through. Also, return leg instructing unit 106 may provide, as the second instruction, an instruction to fly on a path that diverges slightly from the outward leg of the end point and to return to the outward leg from partway through, instead of returning directly from the end point of the outward leg. In short, as long as sufficient examination data is acquired when flying in accordance with the second instruction, the outward leg and the return leg need not entirely coincide.

In the present embodiment, the examination data is image data obtained by shooting facilities, as mentioned above. Accordingly, return leg instructing unit 106 provides, as the second instruction, an instruction to acquire examination data including image data of a greater number of shots of the places of focus compared, for example, with shooting performed in accordance with the first instruction. In the case where shooting is performed at shooting interval D1 on the outward leg as described above, return leg instructing unit 106 generates return leg instruction data for instructing image shooting of places of focus at shooting interval D2, which is shorter than shooting interval D1, while returning on the flight path supplied from outward leg instructing unit 102.

Return leg instructing unit 106 transmits the return leg instruction data to drone 20, which is the transmission destination supplied from outward leg instructing unit 102. The return leg instruction data is received by return leg operation control unit 203 of drone 20 serving as the transmission destination. Return leg operation control unit 203 controls operations of drone 20 (in particular, flight unit 25 and camera 28) on the return leg, in accordance with the second instruction provided by return leg instructing unit 106. Upon reaching the end point of the flight path under the control of outward leg operation control unit 201, drone 20 waits (hovers) at the end point.

Return leg operation control unit 203 then starts flying on the flight path of the return leg triggered by receiving the return leg instruction data, for example. During the return leg flight, return leg operation control unit 203 starts shooting control for shooting images of places other than places of focus (places to undergo normal inspection; hereinafter "normal places") at shooting interval D1, and shooting places of focus at shooting interval D2. When the shooting target switches from a normal place to a place of focus, return leg operation control unit 203 performs the initial shooting at the time of switching to the place of focus, for example, and performs shooting at shooting interval D2 thereafter.

When the shooting target switches from a place of focus to a normal place, return leg operation control unit 203 likewise performs the initial shooting at the time of switching to the normal place, and performs shooting at shooting interval D1 therefrom. It is of note that the shooting method at the time when the shooting target switches is not limited thereto. When the shooting target switches from a normal place to a place of focus, for example, as long as N% (0<N<100) of the shooting interval D1 has passed, return leg operation control unit 203 may next perform shooting when (1−N)% of shooting interval D2 has passed (this similarly applies when switching from a place of focus to a normal place).

Upon causing shooting to be performed via shooting control, return leg operation control unit 203 sends notification to examination data generating unit 202 that shooting has been performed. Upon receiving notification from return leg operation control unit 203, examination data generating unit 202 generates examination data of the facility targeted for examination. The generated examination data of the return leg is acquired by examination data acquiring unit 103 of server apparatus 10, similarly to the examination data of the outward leg.

Examination data acquiring unit 103 stores the acquired examination data of both the outward leg and return leg. The stored examination data is analyzed by a facility examination specialist, for example, and places that require on-site inspection are specified along with places that require immediate repair (reconditioning, reinforcement, coating, replacement, etc.) without need to undergo on-site inspection. Workers perform the work involved in inspecting and repairing the specified places.

Figure 6:
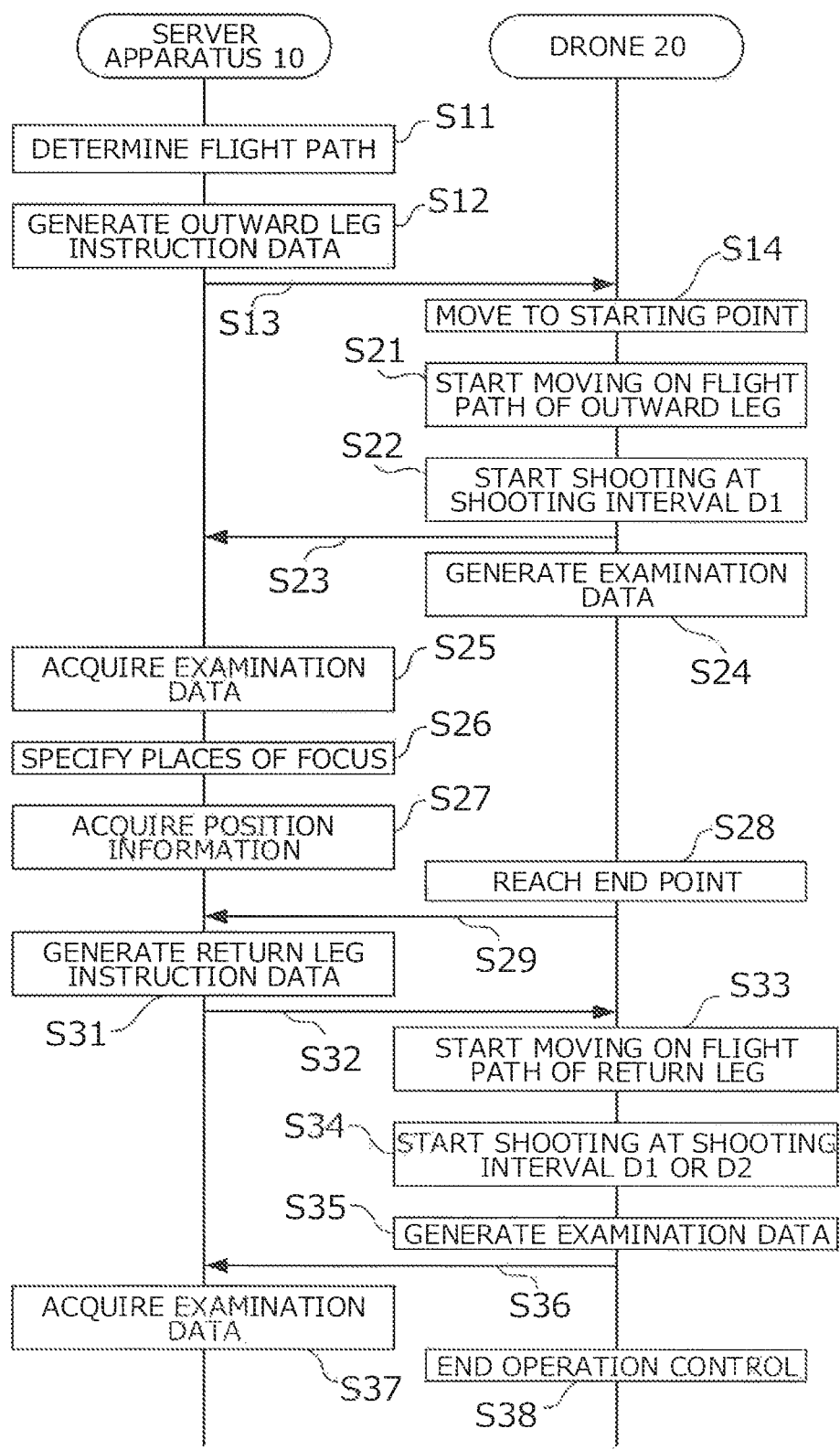
FIG. 6 is a diagram showing an example of operation procedures of apparatuses during instruction processing according to the present invention.

The apparatuses with which facility examination system 1 is provided perform instruction processing for instructing operations of drone 20 to perform facility examination, based on the above configurations. FIG. 6 shows an example of operation procedures of apparatuses in the instruction processing. The operation procedures shown in FIG. 6 are started, triggered by a facility ID and a drone ID input to controller 30 by a user upon transmission to server apparatus 10, for example.

First, server apparatus 10 (outward leg instructing unit 102) determines a flight path based on the position and height and the direction in which to shoot the facility (antenna facility of base station in the present embodiment) identified by the facility ID transmitted thereto (step S11). Next, server apparatus 10 (outward leg instructing unit 102) generates outward leg instruction data indicating, as the first instruction, to perform image shooting at shooting interval D1 while flying on the determined flight path (step S12), and transmits the generated outward leg instruction data to drone 20 (step S13).

Drone 20 (outward leg operation control unit 201) performs control to move to the start point of the flight path shown in the outward leg instruction data transmitted thereto (step S14). Next, drone 20 (outward leg operation control unit 201) starts moving on the flight path of the outward leg (step S21), and starts shooting at shooting interval D1 (step S22). Subsequently, drone 20 (examination data generating unit 202) generates examination data of the facility targeted for examination (step S23), and transmits the generated examination data to server apparatus 10 (step S24).

Figure 7A:
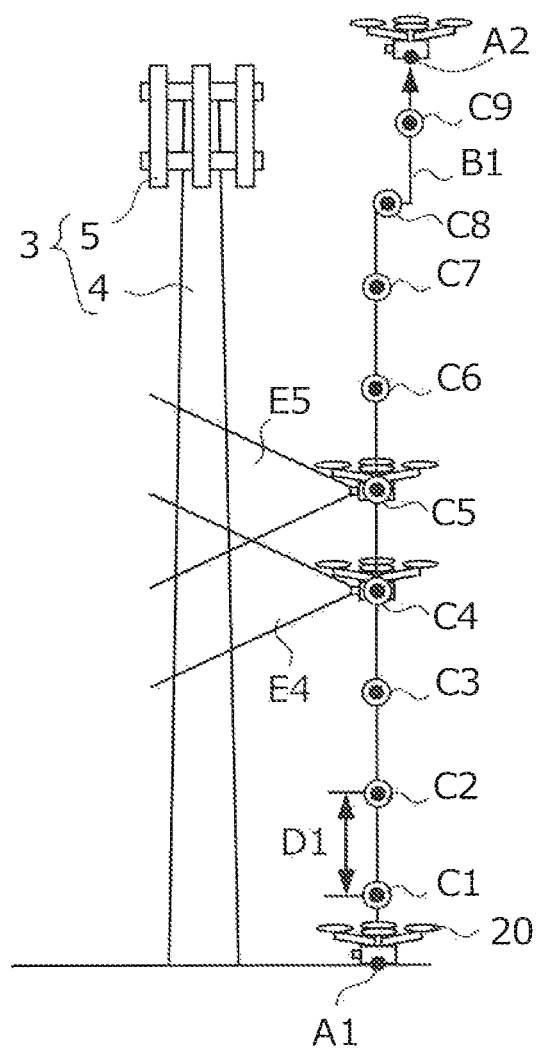
FIGS. 7A and 7B are diagrams showing an example of a flight path and image shooting positions of a drone according to the present invention.
Figure 7B:
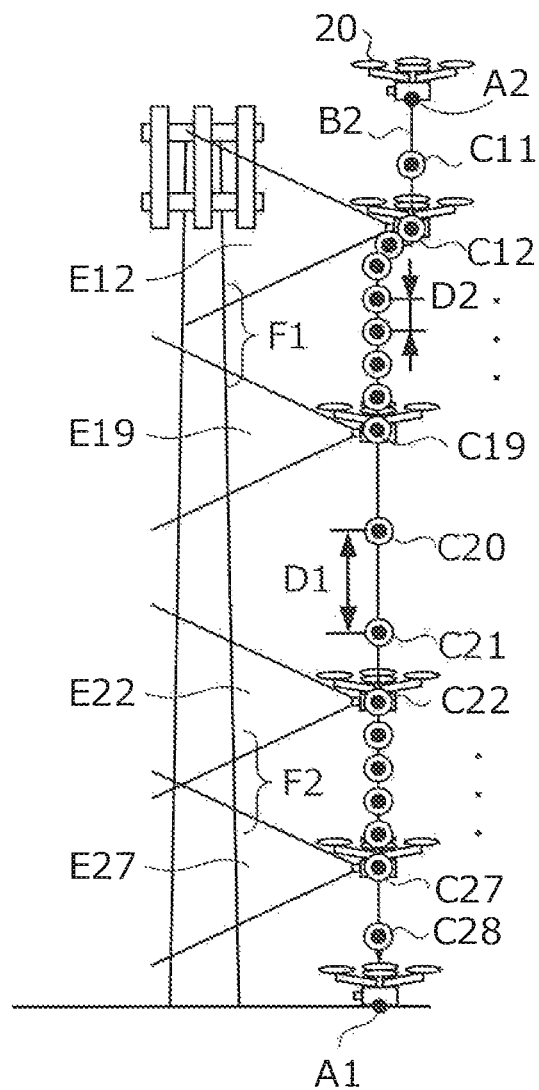

FIGS. 7A and 7B show an example of flight paths and shooting positions of drone 20. In FIGS. 7A and 7B, examination data of antenna facility 3 of a base station is acquired. Antenna facility 3 has support 4 formed in a truncated cone shape and antenna 5. Outward leg instructing unit 102 instruct drone 20 to fly on flight path B1 that moves vertically upward from starting point A1 on the lower side of antenna 5, and climbs to end point A2 after moving in a direction slightly distanced from antenna facility 3 after reaching the height of antenna 5 that protrudes relative to support 4, as shown in FIG. 7A.

Outward leg instructing unit 102 instructs image shooting at nine places from shooting positions C1 to C9 of shooting interval D1 on flight path B1. In the example in FIG. 7, the orientation of camera 28 is fixed such that the lens is facing horizontally when drone 20 is in a horizontal attitude (an attitude in which the left-right direction and back-front direction are parallel to the horizontal). In FIG. 7A, shooting range E4 of shooting position C4 and shooting range E5 of shooting position C5 are shown. As mentioned above, shooting interval D1 is set such that the portions of antenna facility 3 that are included in shooting ranges E4 and E5 overlap and shooting omissions do not occur.

Server apparatus 10 (examination data acquiring unit 103) acquires the received examination data as examination data generated by drone 20 that flies in the vicinity of the facility (step S25). Next, server apparatus 10 (place-of-focus specifying unit 104) specifies places of focus of the facility targeted for examination, based on the acquired examination data (step S26). Subsequently, if a place of focus is specified, server apparatus 10 (position information acquiring unit 105) acquires the position information of the specified place of focus (step S27).

The operation (generation of examination data) at step S23 of drone 20 and the operation (acquisition of position information) at step S27 of server apparatus 10 are repeatedly performed until drone 20 reaches end point A2 of flight path B1 (step S28). In the example shown in FIGS. 7A and 7B, places of focus F1 and F2 shown in FIG. 7B are specified, and the position information of the specified places of focus is acquired. Upon reaching end point A2 of instructed flight path B1, drone 20 transmits notification data to server apparatus 10 notifying that drone 20 has reached end point A2 (step S29).

Upon notification data being received at step S29, server apparatus 10 (return leg instructing unit 106) generates return leg instruction data instructing image shooting of the places of focus at interval D2 (D2<D1) while returning on flight path B1 (step S31). Return leg instructing unit 106 generates, as return leg instruction data, data showing the positions of the places of focus. The positions of the places of focus are shown by positions of drone 20 from which the places of focus can be shot, for example.

Return leg instructing unit 106 specifies shooting positions where a place of focus is included in the shooting range of camera 28, based on the position and range of place of focus F1, the distance of flight path B2 from antenna facility 3, and the orientation and angle of view of camera 28. Return leg instructing unit 106 generates data indicating a range from shooting positions C12 to C19 of flight path B2, as return leg instruction data indicating the position of place of focus F1, for example.

Place of focus F1 is included in the lower end side of shooting range E12 at shooting position C12, and is included in the upper end side of shooting range E19 at shooting position C19. Also, return leg instructing unit 106 generates data indicating the range from shooting positions C22 to C27 of flight path B2, as return leg instruction data indicating the position of place of focus F2. Place of focus F2 is included in the lower end side of shooting range E22 at shooting position C22, and is included in the upper end side of shooting range E27 at shooting position C27.

The shooting intervals from shooting position C12 to C19 and the shooting intervals from shooting position C22 to C27 are each D2 intervals. Also, the shooting intervals of the shooting positions other than shooting positions C12 to C19 and C22 to C27 (e.g., shooting positions C20 and C21) are each D1 intervals, as in the outward leg. It is of note that at a boundary between a place of focus and a normal place (e.g., shooting positions C11 and C12), a shooting interval is less than or equal to D1 and greater than or equal to D2.

Server apparatus 10 (return leg instructing unit 106) transmits the outward leg instruction data generated as described above to drone 20 (step S32). Drone 20 (return leg operation control unit 203) starts moving on flight path B2 of the return leg (step S33), and starts shooting at shooting interval D1 or D2 (step S34), in accordance with the second instruction provided in the return leg instruction data transmitted thereto.

Next, drone 20 (examination data generating unit 202) generates examination data of the facility targeted for examination (step S35), and transmits the generated examination data to server apparatus 10 (step S36). Server apparatus 10 (examination data acquiring unit 103) acquires the received examination data as examination data generated by drone 20 that flies in the vicinity of the facility (step S37). Upon reaching end point A2, drone 20 (return leg operation control unit 203) ends operation control of drone 20 (step S38).

While oversight during examination is more likely to occur with a decrease in an amount of examination data, on the other hand, a burden on an inspector increases with an increase in an amount of examination data. In the present embodiment, examination data having an increased information amount only with regard to places of focus specified from examination data acquired as described above is acquired on the return leg, thus preventing oversight occurring during examination performed with examination data of facilities that is acquired by drone 20. This is in contrast to a case where an amount of examination data is always low.

On the other hand, in the present embodiment, the load for an inspection performed with an amount of examination data can be advantageously limited, which is in contrast to a case where an amount of examination data is always high. The term load used here refers to a load at the time of determining whether deterioration exists and whether repair is required based on examination data, and, for example, is an amount of time and effort required to be expended by an inspector. It is of note that, in a case that determinations are made based on examination data using a computer, the load on the computer is also included.

2. Modifications

The above-mentioned embodiment is merely an example of an implementation of the present invention, and may be modified as follows. The embodiment and modifications may be combined, as appropriate. When combining the embodiment and modifications, the modifications may be implemented in a ranked order (a ranking for determining which modification to prioritize if a conflict occurs when implementing the modifications).

As a specific combining method, modifications that use different parameters to derive a common value (e.g., an image shooting interval) may be combined, and a common value or the like may be derived by using the different parameters in conjunction, for example. Moreover, one value or the like may be derived by summing individually derived values or the like in accordance with an applicable rule. Further, when calculating a common value, the parameters that are used may each be weighted differently.

2-1. Flight Path

The flight path at the time of acquiring examination data is not limited to that described in the embodiment. For example, in the example in FIG. 7, a flight path a direction of which is primarily vertical is used, but in a case where the examination target is a bridge, tunnel or the like, for example, a flight path a direction of which is primarily horizontal may be used. Also, a complex flight path that includes vertical, horizontal and diagonal directions may be used, depending on a structure of an examination target.

In all cases, outward leg instructing unit 102 and return leg instructing unit 106 instruct drone 20 to fly on a flight path in the vicinity of a facility. Also, in the example shown in FIG. 7, only one set consisting of outward flight path B1 and return flight path B2 is used; however, depending on the facility, two or more directions may be used to acquire examination data (in the embodiment, directions in which to shoot images). In this case, server apparatus 10 need only perform the operations of the instruction processing shown in FIG. 6 with regard to all directions.

2-2. Method for Increasing Information Amount

The method for increasing an amount of examination data with the second instruction is not limited to the method described in the embodiment (method of shortening the shooting interval).

For example, if camera 28 is provided with a function for enlarging images that are shot (zoom function), return leg instructing unit 106 may provide, as the second instruction, an instruction to acquire examination data including image data in which places of focus are enlarged, compared with image shooting performed in accordance with the first instruction. By shooting places of focus in an enlargement, it is possible to perform detailed inspection of places of focus, as compared with normal places. In particular, inspection of places where deterioration exists and that are small in size can be facilitated, as compared with a case where a number of shots is increased as in the embodiment.

Also, return leg instructing unit 106 may provide, as the second instruction, an instruction to acquire examination data including image data in which the number of shooting angles of the places of focus is increased, as compared with shooting performed in accordance with the first instruction. Assuming that the places of focus are only shot from the front in accordance with the first instruction, return leg instructing unit 106 provides, as the second instruction, an instruction to also shoot the places of focus diagonally from above, diagonally from below, diagonally from the left and diagonally from the right in addition to from the front.

Return leg operation control unit 203 of drone 20 performs control for shooting places of focus at the number of shooting angles indicated by the second instruction, by changing the position, pitch and direction of drone 20. In a case where the number of shooting angles is increased, inspection for deterioration (deformation, etc.) that appears as a change in three-dimensional form can be facilitated, as compared with a case where the number of shots is increased as in the embodiment.

It is of note that with use of the method of increasing the number of shots as in the embodiment, camera 28 does not require a zoom function. Also, it is necessary to change a flight path, attitude and the like in order to change the number of shooting angles, but in the case of only increasing the number of shots, it is not necessary to perform complex operation control of drone 20, such as changing a flight path. Simply stated, the method of increasing the number of shots can be easily realized as compared with other methods.

It is of note that return leg instructing unit 106 may combine methods of increasing the amount of examination data with the second instruction. For example, return leg instructing unit 106 may perform both the method of shortening the shooting interval and the method of shooting the places of focus in an enlargement, and may also further perform the method of increasing the number of shooting angles of the places of focus at the same time. In short, return leg instructing unit 106 need only provide as the second instruction an instruction to acquire examination data including at least one of image data in which the places of focus are enlarged, image data of a greater number of shots of the places of focus, and image data in which the number of shooting angles of the places of focus is increased, as compared with shooting performed in accordance with the first instruction.

2-3. Shooting Method

In the embodiment, outward leg instructing unit 102 and return leg instructing unit 106 cause drone 20 to perform shooting by instructing a distance shooting interval, but may cause drone 20 to perform shooting by instructing a temporal shooting interval. Provided there is a constant flight speed, the distance shooting interval can be shortened by shortening the temporal shooting interval.

Conversely, provided there is a constant temporal shooting interval, the distance shooting interval can be shortened by slowing the flight speed. Also, outward leg instructing unit 102 and return leg instructing unit 106 may instruct shooting of moving images. Moving images are also obtained by shooting several tens of still images within a period of one second (i.e., the temporal shooting interval is fixed), and thus the distance shooting interval can be shortened by slowing the moving speed.

In a case where the distance shooting interval changes depending on the flight speed as described above, return leg instructing unit 106 may provide as the second instruction an instruction to fly at a slower speed than in accordance with the first instruction when shooting the places of focus. In this case, on the outward leg and the return leg, it is not necessary to change the shooting control method (temporal shooting interval) of camera 28, nor is it necessary to change the flight path, and thus operation control of drone 20 can be simplified, compared with a case where the number of shooting angles is changed, for example.

2-4. Distance Between Drone and Facility

Even in a case where camera 28 is not provided with a zoom function, enlarged images can be shot by shortening the distance from drone 20 to the facility. Accordingly, return leg instructing unit 106 may provide as the second instruction an instruction for causing drone 20 to fly closer to the facility targeted for examination as compared with the first instruction when shooting places of focus.

Figure 8:
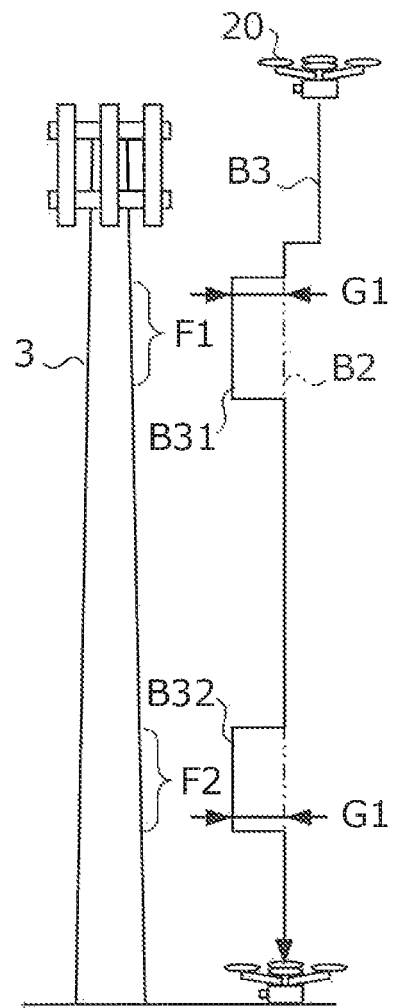
FIG. 8 is a diagram showing an example of a flight path in a modification according to the present invention.

FIG. 8 shows an example of the flight path of this modification. In FIG. 8, antenna facility 3, places of focus F1 and F2, and flight path B2 (two-dot chain line) in FIG. 7 are shown. In the example in FIG. 8, return leg instructing unit 106 determines intermediate path B31 that approaches closer to antenna facility 3 than flight path B2 shown in FIG. 7 by approach distance G1 (distance by which the flight path approaches closer than on the outward leg) in the section having a common height with place of focus F1, and intermediate path B32 that likewise approaches closer to antenna facility 3 than flight path B2 by approach distance G1 in the section having a common height with place of focus F2.

Approach distance G1 is a distance at which drone 20 can approach antenna facility 3 without coming into contact with the facility. Even in a case where drone 20 is not provided with a zoom function, images in which places of focus F1 and F2 are enlarged compared with shooting performed in accordance with the first instruction can be shot by flying on flight path B3. Note that, as the distance between drone 20 and the facility decreases, drone 20 becomes more likely to come into contact with the facility when there is a strong wind blowing, for example. Accordingly, return leg instructing unit 106 may determine the flight path taking into consideration a current wind speed.

Figure 9:
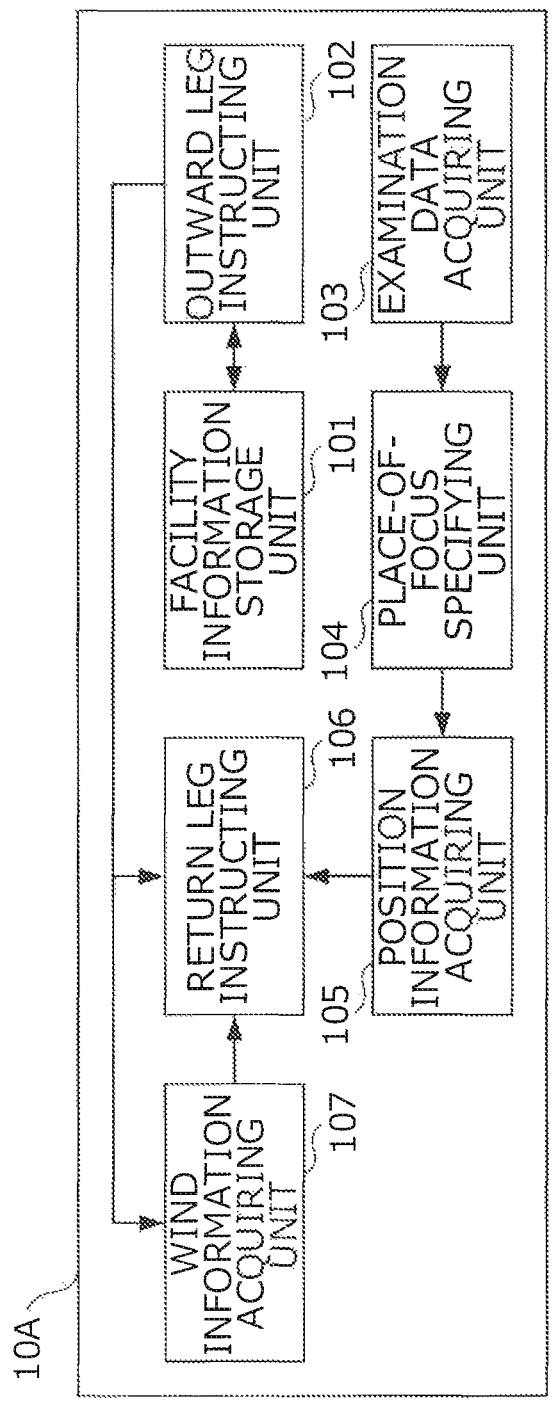
FIG. 9 is a diagram showing a functional configuration realized in a modification according to the present invention.

FIG. 9 shows a functional configuration as realized in this modification. In FIG. 9, there is shown server apparatus 10*a* provided with wind information acquiring unit 107, in addition to the units shown in FIG. 5. Wind information acquiring unit 107 acquires wind information indicating a wind speed and wind direction around the facility targeted for examination. Wind information acquiring unit 107 is an example of a "wind information acquiring unit" of the present invention. In this modification, outward leg instructing unit 102 sends notification of the position of the facility targeted for examination to wind information acquiring unit 107.

Wind information acquiring unit 107 acquires weather information of a region that includes the notified position of the facility from the system of a provider such as a weather forecasting service, and acquires, as wind information, the wind speed and wind direction included in the weather information. It is of note that wind information acquiring unit 107 may acquire wind information measured by use of an anemometer installed in the facility targeted for examination or an anemometer carried by an on-site worker. Wind information acquiring unit 107 supplies the acquired wind information to return leg instructing unit 106.

Return leg instructing unit 106 provides as the second instruction an instruction to increase the distance between drone 20 and the facility as a risk of drone 20 coming into contact with the facility increases. A risk of drone 20 coming into contact with the facility is based on the wind information acquired by wind information acquiring unit 107. Specifically, the risk increases as the wind speed indicated by the wind information increases where the wind direction indicated by the wind information coincides with the direction toward the facility from the flight position of drone 20.

Return leg instructing unit 106 provides the second instruction using a coefficient table in which distance coefficients are associated with windspeeds. FIG. 10 shows an example of the coefficient table. In the example in FIG. 10, distance coefficients "1.0", "0.8" and "0.6" are associated with wind speeds "<Th1", "≥Th1, <Th2", and "≥Th2".

Return leg instructing unit 106 first determines whether the wind direction indicated by the acquired wind information coincides with the direction toward the facility from the flight position of drone 20. If it is determined that the directions do not coincide, return leg instructing unit 106 moves the flight path closer to the facility by approach distance G1 as in the example shown in FIG. 8, for example. If it is determined that the directions coincide, return leg instructing unit 106 moves the flight path closer to the facility by a distance obtained by multiplying approach distance G1 by the distance coefficient associated in the coefficient table with the windspeed indicated by the wind information.

As a result of moving the flight path closer to the facility, drone 20 and antenna facility 3 move closer together by approach distance G1 if the windspeed is less than Th1, but move closer together by a distance of approach distance G1×0.8 if the windspeed is Th1 or more but less than Th2, and move closer together by a distance of approach distance G1×0.6 if the windspeed is Th2 or more. In other words, return leg instructing unit 106 increases the distance between drone 20 and the facility as the wind speed increases. In this modification, the risk of drone 20 coming into contact with the facility can be lessened, by increasing the distance between drone 20 and the facility based on wind information as described above, as compared with the case where the distance between drone 20 and the facility is fixed.

2-5. Degree of Increase in Information Amount

In the above examples, return leg instructing unit 106 provides as the second instruction an instruction to acquire a greater amount of examination data than that in accordance with the first instruction. The degree by which the amount of examination data is increased in accordance with the second instruction is fixed in all the examples except in the case of using wind information; however, an amount of examination data may also be changed to increase.

Figure 11:
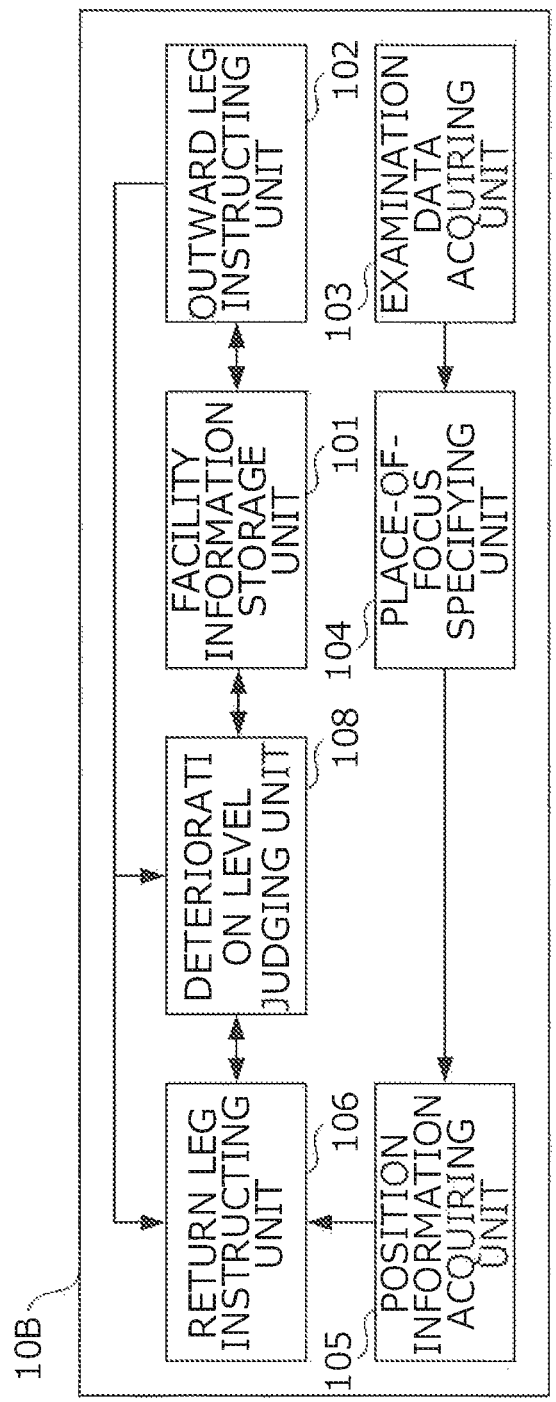
FIG. 11 is a diagram showing a functional configuration realized in a modification according to the present invention.

FIG. 11 shows a functional configuration realized in this modification. In FIG. 11, there is shown server apparatus 10b provided with deterioration level judging unit 108, in addition to the units shown in FIG. 5. Deterioration level judging unit 108 judges, based on information relating to the facility targeted for examination, an overall level of deterioration of the facility. Deterioration level judging unit 108 is an example of a "first judging unit" of the present invention. In this modification, outward leg instructing unit 102 sends notification of the facility ID of the facility targeted for examination to deterioration level judging unit 108.

In this modification, facility information storage unit 101 stores, as facility information, the installation date of respective facilities and the repair date of facilities having a repair history, for example. Deterioration level judging unit 108 reads out the installation date and repair date that are stored in association with the notified facility ID and judges the level of deterioration based on information such as the read installation date. Deterioration level judging unit 108 associates the deterioration period (the period that has passed from the installation date or repair date) with the level of deterioration and judges the level of deterioration using a deterioration level table, for example.

FIG. 12 shows an example of the deterioration level table. In the example shown in FIG. 12, the deterioration periods "<Th11," "≥Th11, <Th12", and "≥Th12" are associated with deterioration levels corresponding to "low," "moderate" and "high." Deterioration level judging unit 108 sets as the deterioration period the period that has passed from the more recent of the read installation date and repair date, and judges, as the deterioration level of the facility, the deterioration level associated in the deterioration level table with the set deterioration period.

Deterioration level judging unit 108 sends notification of the judged deterioration level to return leg instructing unit 106. Return leg instructing unit 106 provides as the second instruction an instruction to acquire examination data having a greater information amount in places of focus as the deterioration level judged by deterioration level judging unit 108 with regard to the facility targeted for examination increases. For example, in a case of increasing the amount of examination data by increasing the number of shots as performed in the embodiment, a shooting interval table in which shooting intervals are associated with deterioration levels is used.

FIG. 13 shows an example of the shooting interval table. In the example shown in FIG. 13, shooting intervals "D11," "D12" and "D13" (D11>D12>D13; all shorter than shooting interval D1 of the outward leg) are associated with the deterioration levels "low," "moderate" and "high." By using the shooting interval table of FIG. 13, return leg instructing unit 106 provides, as the second instruction, an instruction to shoot images of the places of focus at a shorter shooting interval, that is, at an increased number of shots, as the judged deterioration level increases.

When shooting enlarged images of the places of focus, return leg instructing unit 106 provides as the second instruction an instruction to shoot images of the places of focus at a higher magnification as the judged deterioration level increases. Specifically, the magnification factor is set to 120% if the deterioration level is "low," to 140% if the deterioration level is "moderate" and to 160% if the deterioration level is "high," for example.

When increasing the number of shooting angles of the places of focus, return leg instructing unit 106 provides as the second instruction an instruction to shoot images of the places of focus at a higher number of shooting angles as the judged deterioration level increases. Specifically, the shooting angle is set to 3 directions if the deterioration level is "low," to 5 directions if the deterioration level is "moderate" and to 7 directions if the deterioration level is "high," for example.

When reducing the speed at the time of shooting the places of focus, return leg instructing unit 106 provides as the second instruction an instruction to reduce speed more at the time of shooting the places of focus as the judged deterioration level increases. Specifically, the speed is set to a 10% decrease if the deterioration level is "low," to a 20% decrease if the deterioration level is "moderate" and to a 30% decrease if the deterioration level is "high," for example.

When drone 20 flies closer to the facility at the time of shooting the places of focus, return leg instructing unit 106 provides as the second instruction an instruction to increase the approach distance at the time of shooting the places of focus as the judged deterioration level increases. Specifically, the maximum approach distance is set if the deterioration level is "high," a 10% decrease from the maximum approach distance is set if the deterioration level is "moderate" and a 20% decrease from the maximum approach distance is set if the deterioration level is "low," for example.

In the case where places that require repair are missed as deterioration of the facility advances, deterioration will greatly advance before the next examination and more substantial repair will be required. Accordingly, it is desirable to prevent oversight of places that require repair in facilities that are in a more advanced state of deterioration. However, when the information amount of examination data is constantly increased in order to prevent oversight, the inspection load performed with examination data increases. In this modification, by changing the amount of examination data in accordance with the level of deterioration as described above, the inspection load performed with examination data can be reduced while preventing oversight during examination as in the embodiment, even in for facilities in an advanced state of deterioration.

2-6. Method of Specifying Places of Focus

In the embodiment, based on examination data acquired on the outward leg, server apparatus 10 (place-of-focus specifying unit 104) specifies places of focus by analyzing images, but a person (worker) may specify places of focus by viewing examination data, for example. Specification of places of focus must be performed during shooting by drone 20. Accordingly, when examination data is acquired, examination data acquiring unit 103 of server apparatus 10 immediately displays the acquired examination data on a display means, for example.

The worker determines from the displayed examination data (e.g., image data) whether any places of focus are included, and performs an operation for specifying places of focus that are determined as being included. The operation for specifying a place of focus is an operation that involves setting a flag indicating that a place of focus is included in examination data showing images that include the place of focus, for example. Position information acquiring unit 105 acquires position information of the place of focus specified by the operation of the worker. In this modification, the acquired position information is position information of the places of focus that are shown by the acquired examination data, similarly to the embodiment.

2-7. Position Information

In the embodiment, the position information that is acquired by position information acquiring unit 105 shows the positions of places of focus by the position, direction and height of drone 20, but may be information that directly shows the positions of places of focus. For example, coordinates of the places of focus in a three-dimensional coordinate system set in real space (e.g., coordinates of the center of the places of focus; may also be the coordinates of upper and lower ends) may be acquired by position information acquiring unit 105 as position information.

When the coordinates of the places of focus are acquired as position information, position information acquiring unit 105 computes the coordinates based on the distance between drone 20 and the facility and the position of the places of focus in shot images, in addition to the position, direction and height of drone 20 when the places of focus were shot, for example. Position information acquiring unit 105 acquires the computed coordinates as the position information of the places of focus. The position information in this case may also be represented by the direction and height (e.g., "south facing position at a height of 5 m," etc.) from the facility, for example, apart from coordinates. In short, any information may be acquired as position information, as long as the positions of places of focus are indicated.

2-8. Type of Deterioration

Place-of-focus specifying unit 104 specifies deteriorated places as places of focus, based on examination data acquired on the outward leg. Types of deterioration include corrosion, separation, detachment, breakage, cracking, deformation, and deterioration-related discoloration. Some types of deterioration can be easily identified from examination data while other types of deterioration are more difficult to identify.

Figure 14:
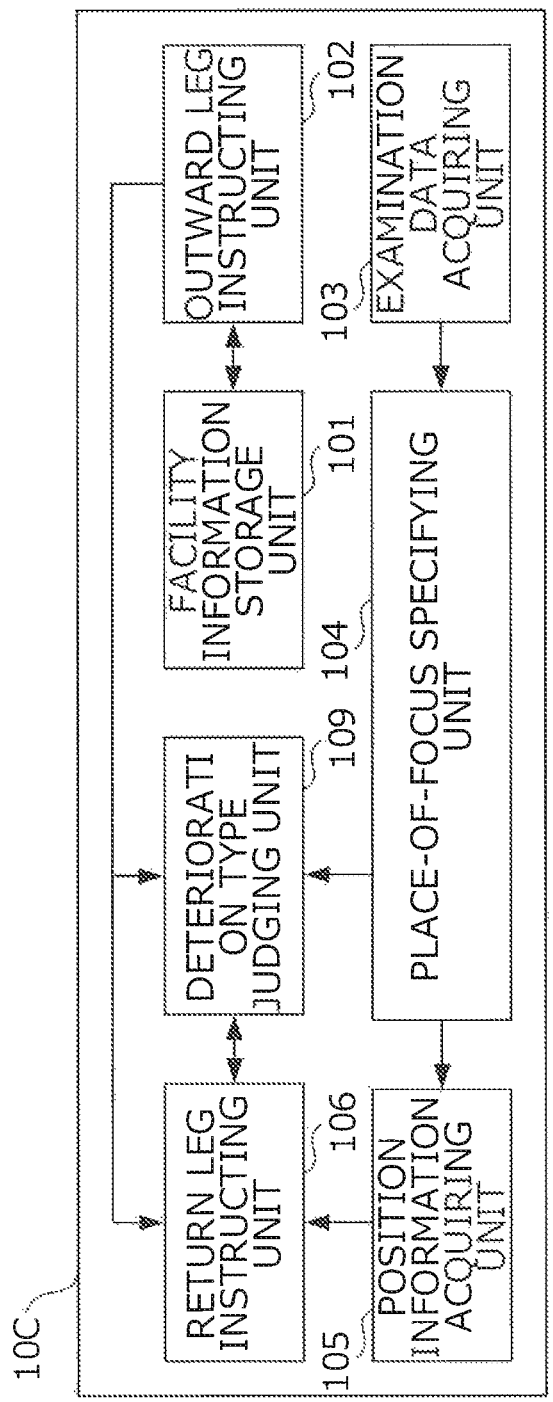
FIG. 14 is a diagram showing a functional configuration realized in a modification according to the present invention.

Accordingly, in this modification, examination data of an amount sufficient to identify the type of deterioration is acquired. FIG. 14 shows a functional configuration realized in this modification. In FIG. 14, server apparatus 10c provided with deterioration type judging unit 109 in addition to the units in FIG. 5 is shown. Deterioration type judging unit 109 judges the type of deterioration in the places of focus indicated by the position information acquired by position information acquiring unit 105. Deterioration type judging unit 109 is an example of a "second judging unit" of the present invention.

In this modification, place-of-focus specifying unit 104 specifies a place of focus using the above-mentioned deterioration feature information, for example, and supplies to deterioration type judging unit 109 the deterioration feature information used in specifying the place of focus (deterioration feature information in which a feature appears in the place of focus). Deterioration type judging unit 109 judges as the type of deterioration in the place of focus the deteriorated state indicated by the supplied deterioration feature information. In this case, types of deterioration such as corrosion, separation, breakage, cracking and deterioration-related discoloration are judged.

When using the above-mentioned method of comparison with images of the same facility shot in the past, place-of-focus specifying unit 104 supplies to deterioration type judging unit 109 the feature amount of places where the amount of change in the feature amount is at or above a threshold value. Deterioration type judging unit 109 judges that deformation has occurred if the area of the facility in the image indicated by the supplied feature amount has not changed, and judges that detachment has occurred if the area of the facility in the image has changed. Deterioration type judging unit 109 sends to return leg instructing unit 106 notification of the judged type of deterioration.

Return leg instructing unit 106 provides, as the second instruction, an instruction to increase the amount of information indicated by the examination data that is acquired with regard to a place of focus by an amount associated with the type of deterioration judged by deterioration type judging unit 109 with regard to the place of focus. For example, in the case of increasing the information amount by increasing the number of shots as in the embodiment, a shooting interval table in which shooting intervals are associated with types of deterioration is used.

FIG. 15 shows an example of the shooting interval table of this modification. In the example in FIG. 15, shooting intervals "D21," "D22" and "D23" (D21>D22>D23; all shorter than shooting interval D1 of the outward leg) are associated with types of deterioration "detachment, deterioration-related discoloration," "corrosion, breakage" and "separation, cracking, deformation." By using the shooting interval table of FIG. 15, return leg instructing unit 106 provides, as the second instruction, an instruction to shoot images of a place of focus at a shooting interval that is shortened over the outward leg to the shooting interval associated with the judged type of deterioration, that is, at an increased number of shots.

When shooting enlarged images of the places of focus, return leg instructing unit 106 provides as the second instruction an instruction to shoot images of the places of focus enlarged by the magnification factor associated with the judged type of deterioration. Specifically, the magnification factor is set to 120% if the type of deterioration is "detachment, deterioration-related discoloration, to 140% if the type of deterioration is "corrosion, breakage" and to 160% if the type of deterioration is "separation, cracking, deformation," for example.

When increasing the number of shooting angles of the places of focus, return leg instructing unit 106 provides, as the second instruction, an instruction to shoot images of the places of focus at shooting angles increased by the number associated with the judged type of deterioration. Specifically, the shooting angle is set to 3 directions if the type of deterioration is "detachment, deterioration-related discoloration," to 5 directions if the type of deterioration is "corrosion, breakage" and to 7 directions if the type of deterioration is "separation, cracking, deformation," for example.

When reducing the speed at the time of shooting the places of focus, return leg instructing unit 106 provides, as the second instruction an instruction to reduce the speed at the time of shooting the places of focus to the speed associated with the judged type of deterioration. Specifically, the speed is set to a 10% decrease if the type of deterioration is "detachment, deterioration-related discoloration," to a 20% decrease if the type of deterioration is "corrosion, breakage" and to a 30% decrease if the type of deterioration is "separation, cracking, deformation," for example.

When flying drone 20 closer to the facility at the time of shooting the places of focus, return leg instructing unit 106 provides as the second instruction an instruction to increase the approach distance at the time of shooting the places of focus to the distance associated with the judged type of deterioration. Specifically, the maximum approach distance is set if the type of deterioration is "separation, cracking, deformation," a 10% decrease from the maximum approach distance is set if the type of deterioration is "corrosion, breakage" and a 20% decrease from the maximum approach distance is set if the type of deterioration is "detachment, deterioration-related discoloration," for example.

For example, with "separation, cracking" a greater information amount is required, since changes in units of 0.1 to 1 mm from the original state must be found. Also, "deformation" is a type of deterioration that is harder to find than "detachment" and thus requires a greater amount of information. Conversely, "detachment, deterioration-related discoloration" are types of deterioration that are easy to find, and thus a large amount of information is not required. In terms of ease of finding, "Corrosion, breakage" reside between "deformation" and "detachment, deterioration-related discoloration."

As described above, when the type of deterioration differs, the ease of finding places of focus also differs. Thus, by setting the degree of increase of the amount of information amount based on the type of deterioration as in this modification, oversight can also be prevented with regard to places that require repair due to the occurrence of deterioration of a type that is hard to find, while reducing an inspection load performed with examination data, similarly to the embodiment. It is of note that the relationship between the type of deterioration and the ease of finding the deterioration described above is merely an example, and a relationship that differs depending on the examination target and the inspector may be used.

2-9. Type of Structure

The types of structures included in facilities targeted for examination are steel towers, foundations, electrical equipment, antennas, ladders and the like, for example. Depending on the type of structure urgency for repair differs. Accordingly, a configuration may be adopted in which an amount of examination data sufficient to meet a need for urgency of repair is acquired.

Figure 16:
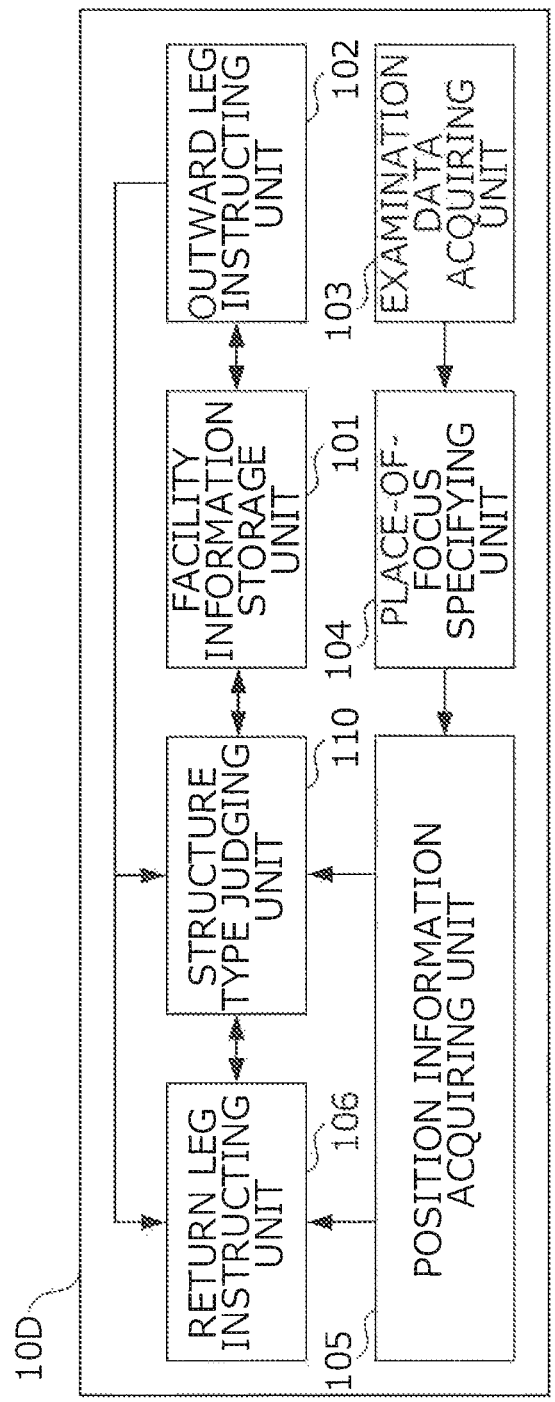
FIG. 16 is a diagram showing a functional configuration realized in a modification according to the present invention.

FIG. 16 shows a functional configuration realized in this modification. In FIG. 16, server apparatus 10d provided with structure type judging unit 110 in addition to the units in FIG. 5 is shown. Structure type judging unit 110 judges the type of structure that is a place of focus indicated by the position information acquired by position information acquiring unit 105. Structure type judging unit 110 is an example of a "third judging unit" of the present invention.

In this modification, facility information storage unit 101 stores facility information indicating the position of each structure included in the facility. Also, position information acquiring unit 105 supplies acquired position information to structure type judging unit 110. Upon supply of position information, structure type judging unit 110 reads the facility information of the corresponding facility from facility information storage unit 101, and judges the structure at the position of the place of focus indicated by the supplied position information.

Structure type judging unit 110 sends notification of the judged type of structure to return leg instructing unit 106. Return leg instructing unit 106 provides as the second instruction an instruction to increase the information amount shown by the examination data acquired with regard to the place of focus by the amount associated with the type of structure judged by structure type judging unit 110 with regard to the place of focus. For example, in the case of increasing the information amount by increasing the number of shots as in the embodiment, a shooting interval table in which shooting intervals are associated with types of structures is used.

FIG. 17 shows an example of the shooting interval table of this modification. In FIG. 17, shooting intervals "D31," "D32" and "D33" (D31>D32>D33; all shorter than shooting interval D1 of the outward leg) are associated with the types of structures "steel tower, foundation," "ladder" and "antenna, electrical equipment." By using the shooting interval table of FIG. 17, return leg instructing unit 106 provides as the second instruction an instruction to shoot images of a place of focus at a shooting interval that is shortened over the outward leg to the shooting interval associated with the type of structure that is the place of focus, that is, at an increased number of shots.

When shooting enlarged images of the places of focus, in the case of increasing the number of shooting angles of the places of focus, in the case of reducing the speed at the time of shooting the places of focus, and in the case of flying drone 20 close to the facility at the time of shooting the places of focus, return leg instructing unit 106 provides the second instruction in a similar manner to the case for the type of facility used in the above modification. In all cases, oversight during examination can be prevented, even when deterioration occurs in a type of structure that requires urgent repair, while reducing the inspection load performed with examination data, similarly to the embodiment.

2-10. Acquisition of Examination Data from Multiple Directions

When a facility having only slight thickness such as a steel tower, for example, deterioration that occurs on the front side may extend to the back side. Also, when examination data is acquired from not only the front and back sides but from multiple directions, deterioration that occurs in a place that can be seen from a provided direction may extend to an area that can be seen from another direction.

Accordingly, in this modification, in the case where examination data acquiring unit 103 acquires examination data of the facility targeted for examination from a first direction side and a second direction side (the second direction differs from the first direction), the second instruction is provided as follows: return leg instructing unit 106 provides as the second instruction an instruction to acquire a greater amount of examination data than that in accordance with the first instruction even if position information indicating a place corresponding to the place of focus is not acquired when acquiring examination data of the facility from the second direction side, where a place on the second direction side corresponds to the place of focus indicated by the position information acquired by position information acquiring unit 105 on the first direction side.

The place on the second direction side that corresponds to the place of focus on the first direction side is, for example, a place on the back side of the place of focus or a place adjacent to the place of focus. All of the places are located in a direction orthogonal to the direction in which drone 20 flies (at the same height if drone 20 flies vertically as in the embodiment) as seen from the place of focus. For example, there are cases where deterioration is markedly apparent from the first direction side but is scarcely apparent from the second direction side.

In this case, a place of focus may not be specified from the examination data of the outward leg, with regard to a place on the second direction side in which deterioration is only slightly apparent. This could lead to such deterioration being missed as a result of an increased amount of examination data not being acquired on the return leg. In this modification, if a place of focus is specified on the first direction side, an increased amount of examination data is also acquired on the second direction side, thus making it easier to find deterioration in places where deterioration is only slightly apparent, as compared with a where the second instruction of this modification is not provided.

2-11. Flight by Manual Operation

In the embodiment, drone 20 flies autonomously, but an operator may take over control flight of drone 20 by manual operation using controller 30 or the like. In the case of flying drone 20 via manual operation by the operator, the first instruction and the second instruction are provided to the operator.

Specifically, outward leg instructing unit 102 transmits the outward leg instruction data to controller 30, and controller 30 displays the content of the first instruction shown by the outward leg instruction data, thus conveying the first instruction to the operator. Also, the second instruction is conveyed to the operator by return leg instructing unit 106 transmitting the return leg instruction data to controller 30, and controller 30 displaying the content of the second instruction shown by the return leg instruction data.

It is of note that autonomous flight may be performed on the outward leg and flight via manual operation may be performed on the return leg, or conversely, flight via manual operation may be performed on the outward leg and autonomous flight may be performed on the return leg. Also, flight via manual operation or autonomous flight may be performed only at places of focus. In short, as long as flight in accordance with the first instruction and the second instruction and acquisition of examination data are performed, drone 20 may either operate autonomously or operate via manual operation by the operator.

2-12. Aerial Vehicle

In the embodiment, the aerial vehicle that flies autonomously is a rotary-wing aerial vehicle, but may be an airplane-type aerial vehicle, and may also be a helicopter-type aerial vehicle, for example. In short, any aerial vehicle capable of flying in accordance with the first instruction and the second instruction and that has a function for acquiring examination data can be used.

2-13. Apparatuses for Realizing Functions

The apparatuses for realizing the functions shown in FIG. 5 and the like are not limited to the above-mentioned apparatuses. For example, the functions realized by server apparatus 10 may be realized by controller 30 or a user terminal such as a smartphone that is utilized by a user. In this case, controller 30 or the user terminal serves as an example of an "information processing device" of the present invention. Also, drone 20 may itself realize the functions shown in FIG. 5 and the like, as long as drone 20 has sufficient processing capacity. In this case, drone 20 serves as an example of an "information processing device" of the present invention. In short, the functions shown in FIG. 5 and the like need only be realized by facility examination system 1 as a whole.

2-14. Category of Invention

The present invention can also be regarded as an information processing system (facility examination system 1 being one example) provided with information processing devices and an aerial vehicle such as drone 20, other than the information processing devices such as server apparatus 10 and the like. The present invention can be regarded as an information processing method for realizing processing that is implemented by the information processing devices, and can also be regarded as a program for causing computers that control the information processing devices to function. The program regarded as the present invention may be provided in the form of a recording medium such as an optical disc or the like on which the program is stored, and may also be provided by downloading the program onto a computer via a network such as the Internet, and installing the downloaded program for utilization.

2-15. Functional Blocks

It is of note that the block diagrams used in describing the above embodiment show blocks in functional units. These functional blocks (constituent units) are realized by freely combining hardware and/or software. Also, the method of realizing the functional blocks is not particularly limited.

That is, the functional blocks may be realized by using one apparatus that is physically or logically integrated, or two or more apparatuses that are physically or logically separated may be connected (e.g., by cable, wirelessly, etc.) and the functional blocks may be realized using this plurality of apparatuses. The functional blocks may also be realized by combining software with the above one apparatus or the above plurality of apparatuses.

Functions include determining (both meanings of "to judge" and "to decide"), judging, calculating, computing, processing, deriving, investigating, looking up/searching/inquiring, ascertaining, receiving, transmitting, outputting, accessing, resolving, selecting, choosing, establishing, comparing, assuming, expecting, regarding, broadcasting, notifying, communicating, forwarding, configuring, reconfiguring, allocating/mapping, and assigning, but are not limited thereto. For example, the functional block (constituent unit) that realizes the transmission function is referred to as a transmitting unit or a transmitter. As mentioned above, the method of realizing any of the functional blocks is not particularly limited.

2-16. Direction of Input/Output

Information and the like (see "Information, Signals" section) can be output from a higher layer to a lower layer, or from a lower layer to a higher layer. Input and output may also be performed via a plurality of network nodes.

2-17. Handling of Input/Output Information, Etc.

Information and the like that has been input or output may be saved to a specific location (e.g., a memory), and may also be managed by use of a management table. Information and the like that is input or output can be overwritten, updated or added. Information and the like that has been output may be deleted. Information and the like that has been input may be transmitted to other apparatuses.

2-18. Judgement Method

Judgement may be performed using a value (0 or 1) represented by 1 bit, or may be performed by boolean operation (true or false), or may be performed by numerical comparison (e.g., comparison with a predetermined value).

2-19. Notification of Information, Signaling

Notification of information is not limited to the modes/embodiment described in the present disclosure, and may be performed using other methods. For example, notification of information may be implemented by physical layer signaling (e.g., DCI (Downlink Control Information), UCI (Uplink Control Information)), higher layer signaling (e.g., RRC (Radio Resource Control) signaling, MAC (Medium Access Control) signaling), broadcast information (MIB (Master Information Block), SIB (System Information Block)), other signals, or a combination thereof. Also, RRC signaling may be referred to as an RRC message, and, for example, may be an RRC Connection Setup message, an RRC Connection Reconfiguration message, and the like.

2-20. Processing Procedures, Etc.

The order of the processing procedures, sequences, flow-charts and the like of the modes/embodiment described in the present disclosure may be changed, as long as there are no inconsistencies. For example, with regard to the methods described in the present disclosure, the elements of various steps are presented in an illustrative order, but are not limited to the specific order in which they are presented.

2-21. Handling of Input/Output Information, Etc.

Information and the like that has been input or output may be saved to a specific location (e.g., a memory), and may also be managed by use of a management table. Information and the like that is input or output can be overwritten, updated or added. Information and the like that has been output may be deleted. Information and the like that has been input may be transmitted to other apparatuses.

2-22. Software

Software is intended to be broadly interpreted to mean instructions, instruction sets, code, code segments, program code, programs, subprograms, software modules, applications, software applications, software packages, routines, subroutines, objects, executable files, execution threads, procedures, functions and the like, regardless of whether it is referred to as software, firmware, middleware, microcode or hardware description language, or by other names.

Also, software, instructions, information and the like may be transmitted and received via a transmission medium. For example, in a case where software is transmitted from a website, a server or other remote source using at least one of wired technology (coaxial cable, fiber optic cable, twisted pair wire, digital subscriber line (DSL), etc.) and wireless technology (infrared rays, microwaves, etc.), at least one of these wired and wireless technologies is included in the definition of a transmission medium.

2-23. Information, Signals

The information, signals and the like described in the present disclosure may be represented by use of any of a variety of different technologies. For example, data, instructions, commands, information, signals, bits, symbols, chips and the like that can be referred to throughout the above description as a whole may also be represented by voltages, currents, electromagnetic waves, magnetic fields or magnetic particles, optical fields, photons, or any combination thereof.

It is of note that the terms described in the present disclosure and the terms required to understand the present disclosure may be substituted by terms having a same or similar meaning. For example, at least one of channels and symbols may be signals (signaling). Further, signals may be messages. Still further, a component carrier (CC) may be referred to as a carrier frequency, cell, frequency carrier, and the like.

2-24. System, Network

The terms "system" and "network" used in the present disclosure can be used interchangeably.

2-25. Names of Parameters, Channels

Information, parameters and the like described in the present disclosure may be represented using absolute values, may be represented using relative values from predetermined values, and may also be represented using other corresponding information. For example, wireless resources may be instructed by an index.

Names that are used for the above-mentioned parameters are not restrictive names in any respect. Furthermore, mathematical expressions and the like that use these parameters may also differ from those explicitly disclosed in the present disclosure. Various channels (e.g., PUCCH, PDCCH, etc.) and information elements can be identified by any manner of appropriate names, and thus the various names allocated to these various channels and information elements are not restrictive in any respect.

2-26. "Determining"

The term "determining" (meaning "to judge" and "to decide") as used in the present disclosure may encompass diverse actions. "Determining" can, for example, include the actions of judging, calculating, computing, processing, deriving, investigating, looking up/searching/inquiring, (e.g., searching tables, databases and another data structures) with ascertaining being considered as an act of "determining."

Also, "determining" can, for example, include the acts of receiving (e.g., receiving information), transmitting (e.g., transmitting information), inputting, outputting, and accessing (e.g., accessing data in memory) being considered as the act of "determining." Also, "determining" can, for example, include the acts of resolving, selecting, choosing, establishing, comparing and the like being considered as the act of "determining." In other words, "determining" can include an act that is an act of "determining." Also, "determining" may be read as "assuming" "expecting," "considering" and the like.

2-27. Meaning of "Based On"

The phrase "based on" that is used in the present disclosure does not mean "based only on" unless specifically stated otherwise. In other words, the phrase "based on" means both "based only on" and "based at least on."

2-28. "Differ"

In the present disclosure, the phrase "A and B differ" may mean "A and B differ from each other.". It is of note that this phrase may also mean "A and B respectively differ from C." Terms such as "distanced" and "integrated" may be similarly interpreted as "differ."

2-29. "And", "Or"

In the present disclosure, with regard to configurations that can be implemented with both "A and B" and "A or B," a configuration described by one of these expressions may be a configuration described by the other of the expressions. For example, a configuration described as "A and B" may be used as "A or B" as long as implementation is possible without any inconsistencies arising with respect to other descriptions.

2-30. Variations of Modes, Etc.

The modes/embodiment described in the present disclosure may be used independently, may be used in combination, and may also be used through switching following execution. Also, notification of predetermined information (e.g., notification that "X is the case") is not limited to that performed explicitly, and may be performed implicitly (e.g., by not performing notification of the predetermined information).

Although the present disclosure has been described in detail above, it will be apparent to a person skilled in the art that the disclosure is not limited to the embodiment described in the disclosure. The present disclosure can be implemented with revised and modified modes without departing from the spirit and scope of the disclosure which is defined by the description in the claims. Accordingly, the description of the present disclosure is intended as an illustrative description and does not have any restrictive meaning whatsoever with respect to the disclosure.

REFERENCE SIGNS LIST

1 Facility examination system
10 Server apparatus
20 Drone
30 Controller
101 Facility information storage unit
102 Outward leg instructing unit
103 Examination data acquiring unit
104 Place-of-focus specifying unit
105 Position information acquiring unit
106 Return leg instructing unit
107 Wind information acquiring unit
108 Deterioration level judging unit
109 Deterioration type judging unit
110 Structure type judging unit
201 Outward leg operation control unit
202 Examination data generating unit
203 Return leg operation control unit

The invention claimed is:
1. An information processing device comprising:
a first instructing unit configured to provide a first instruction for causing an aerial vehicle having a function for acquiring examination data of an examination target remotely to acquire examination data of a facility while flying in the vicinity of the facility;
a position acquiring unit configured to acquire position information of a specific place indicated as requiring detailed inspection based on the examination data acquired in accordance with the first instruction;
a second instructing unit configured to provide a second instruction for causing the aerial vehicle to acquire a greater amount of examination data than that acquired in accordance with the first instruction with regard to the specific place indicated by the acquired position information, while flying so as to return on a path flown due to the first instruction; and
a first judging unit configured to judge a deterioration level of the facility as a whole based on information relating to the facility;
wherein the second instructing unit provides as the second instruction an instruction to acquire an increasing amount of the examination data for the specific place as the deterioration level judged with regard to the facility increases.

2. The information processing device according to claim 1,
wherein the examination data is image data obtained by shooting the facility, and
the second instructing unit provides as the second instruction an instruction to acquire examination data including at least one of image data in which the specific place is enlarged, image data of a greater number of shots of the specific place, and image data in which the number of shooting angles of the specific place is increased as compared with shooting performed in accordance with the first instruction.

3. The information processing device according to claim 1,
wherein the second instructing unit provides as the second instruction an instruction to fly at a slower speed than that in accordance with the first instruction when shooting the specific place.

4. An information processing device comprising:
a first instructing unit configured to provide a first instruction for causing an aerial vehicle having a function for acquiring examination data of an examination target remotely to acquire examination data of a facility while flying in the vicinity of the facility;
a position acquiring unit configured to acquire position information of a specific place indicated as requiring detailed inspection based on the examination data acquired in accordance with the first instruction;
a second instructing unit configured to provide a second instruction for causing the aerial vehicle to acquire a greater amount of examination data than that acquired in accordance with the first instruction with regard to the specific place indicated by the acquired position information, while flying so as to return on a path flown due to the first instruction; and
a second judging unit configured to judge a type of deterioration of the specific place indicated by the acquired position information;
wherein the second instructing unit provides as the second instruction an instruction to increase the examination data acquired with regard to the specific place by an amount associated with the type of deterioration judged with regard to the specific place.

5. The information processing device according to claim 1, further comprising:
a third judging unit configured to judge a type of structure of the specific place indicated by the acquired position information,
wherein the second instructing unit provides as the second instruction an instruction to increase the examination data acquired with regard to the specific place by an amount in association with the type of structure judged with regard to the specific place.

6. The information processing device according to claim 1,
wherein the second instructing unit provides as the second instruction an instruction for causing the aerial vehicle to fly closer to the facility than in accordance with the first instruction when shooting the specific place.

7. The information processing device according to claim 6, further comprising:
a wind information acquiring unit configured to acquire wind information indicating a wind speed and wind direction around the facility,
wherein the second instructing unit provides as the second instruction an instruction to increase a distance between the aerial vehicle and the facility as a risk of the aerial vehicle coming into contact with the facility indicated by the acquired wind information increases.

8. The information processing device according to claim 1,
wherein, in a case of acquiring examination data of the facility from a first direction side and a second direction side, the second instructing unit provides as the second instruction an instruction to acquire with regard to a place on the second direction side corresponding to a specific place indicated by position information acquired on the first direction side, a greater amount of examination data than that acquired in accordance with the first instruction even if position information indicating the specific place is not acquired when acquiring the examination data of the facility from the second direction side.

9. An information processing method comprising:
providing a first instruction for causing an aerial vehicle having a function for acquiring examination data of an examination target remotely to acquire the examination data of the facility while flying in the vicinity of the facility;
acquiring position information of a specific place indicated as requiring detailed inspection based on the examination data acquired in accordance with the first instruction;
providing a second instruction for causing the aerial vehicle to acquire a greater amount of examination data than that acquired in accordance with the first instruction with regard to the specific place indicated by the acquired position information, while flying so as to return on a path flown due to the first instruction; and
judging a deterioration level of the facility as a whole based on information relating to the facility;
wherein the second instruction is provided as an instruction to acquire an increasing amount of the examination data for the specific place as the deterioration level judged with regard to the facility increases.

10. An information processing method comprising:
providing a first instruction for causing an aerial vehicle having a function for acquiring examination data of an examination target remotely to acquire the examination data of the facility while flying in the vicinity of the facility;
acquiring position information of a specific place indicated as requiring detailed inspection based on the examination data acquired in accordance with the first instruction;
providing a second instruction for causing the aerial vehicle to acquire a greater amount of examination data than that acquired in accordance with the first instruction with regard to the specific place indicated by the acquired position information, while flying so as to return on a path flown due to the first instruction; and
judging a type of deterioration of the specific place indicated by the acquired position information;
wherein the second instruction is provided as an instruction to increase the examination data acquired with regard to the specific place by an amount associated with the type of deterioration judged with regard to the specific place.

* * * * *